(12) United States Patent
Fehringer

(10) Patent No.: US 9,884,683 B2
(45) Date of Patent: Feb. 6, 2018

(54) LIGHT PROGRAM FOR INTERIOR LIGHTING IN AN AIRCRAFT

(71) Applicant: DIEHL AEROSPACE GMBH, Ueberlingen (DE)

(72) Inventor: Sebastian Fehringer, Nuremberg (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 15/612,271

(22) Filed: Jun. 2, 2017

(65) Prior Publication Data

US 2017/0349286 A1 Dec. 7, 2017

(30) Foreign Application Priority Data

Jun. 2, 2016 (DE) .................. 10 2016 006 765

(51) Int. Cl.
*G06F 19/00* (2011.01)
*B64D 11/00* (2006.01)
(Continued)

(52) U.S. Cl.
CPC .............. *B64D 11/00* (2013.01); *B60Q 3/74* (2017.02); *B60Q 3/80* (2017.02); *B64D 2011/0038* (2013.01)

(58) Field of Classification Search
CPC ........ B64D 45/0015; B64D 2045/0045; B64D 2700/62271; G01C 23/00; G01C 23/005;
(Continued)

(56) References Cited

U.S. PATENT DOCUMENTS 5,176,133 A 1/1993 Czeisler et al.
8,942,916 B2 * 1/2015 Merl .................... G08G 5/0017
701/120

(Continued)

FOREIGN PATENT DOCUMENTS

DE 3855909 T2 12/1997
DE 102007011155 A1 9/2008
(Continued)

*Primary Examiner* — Minh D A
(74) *Attorney, Agent, or Firm* — Scully Scott Murphy and Presser; Frank DiGiglio

(57) ABSTRACT

In a method for producing a light program (22) for controlling lighting in an interior (80) of an aircraft (82) during a flight, a sequence list (2a, b) of phases of the day (4a-l) for a full day is set, wherein a time of day (6), a phase duration (8) and lighting data (La-l) for the lighting are assigned to each phase of the day (4a-l), the appropriate phase of the day (4a-l) is selected from the sequence list (2a, b) as first program section (14a) of a flight program (10) on the basis of the local time (12a) at which the flight starts and the proportional associated phase duration (8) is assigned to the first program section as section duration (16a), the appropriate phase of the day (4a-l) is selected from the sequence list (2a, b) as last program section (14b-e) of the flight program on the basis of the local time (12b) at which the flight lands and the proportional associated phase duration (8) is assigned to the last program section (14b-e) as section duration (16b-e), the flight program (10) between first program section (14a) and last program section (14b-e) is filled with the phases of the day (4a-l), lying therebetween as per the sequence list (2a, b), as program sections (14b-d) and the associated phase durations (8) are assigned to the program sections (14b-d) as section durations (16b-d), at least one of the section durations (16a-e) is scaled on the basis of a scaling prescription in such a way that the overall duration of the flight program (10) corresponds to the flight duration (TF), the flight program (10) runs in time during the flight on the basis of the elapsed flight time (t), wherein the
(Continued)

lighting data (La-l) of the respective current program section (14*a-e*) are output as light program (22) at each instant of the flight time (t).

12 Claims, 8 Drawing Sheets

(51) Int. Cl.
    *B60Q 3/80*     (2017.01)
    *B60Q 3/74*     (2017.01)

(58) Field of Classification Search
    CPC .... G08G 5/0013; G08G 5/0021; G08G 5/025; G08G 5/0086; B64F 1/20; G01S 1/02; G01S 1/70; G01S 13/9303; G01P 5/07; B64C 13/04
    See application file for complete search history.

(56) References Cited

U.S. PATENT DOCUMENTS

| | | |
|---|---|---|
| 2005/0185399 A1 | 8/2005 | Beermann et al. |
| 2008/0219013 A1 | 9/2008 | Budinger et al. |
| 2010/0174345 A1 | 7/2010 | Ashdown |

FOREIGN PATENT DOCUMENTS

| | | |
|---|---|---|
| EP | 1561640 A2 | 8/2005 |
| EP | 2724746 A1 | 4/2014 |
| WO | WO 90/00777 A1 | 1/1990 |

\* cited by examiner

Fig. 1 a)

| | | | |
|---|---|---|---|
| 13210 | day | La | 50% |
| 13220 | evening | Lb | 12% |
| 13230 | sunset | ... | 38% |
| 13240 | sleep | Ld | |
| 13250 | sunrise | Le | |

Times: 7:00, 19:00, 20:00, 20:30, 6:30, 7:00 b)

| | | | |
|---|---|---|---|
| 13111 | morning | La | 40% |
| 13112 | noon | Lb | |
| 13113 | afternoon | | |
| 13121 | evening | | 18% |
| 13122 | dinner-time | | |
| 13131 | night | | 42% |
| 13132 | go to bed | ... | |
| 13141 | falling asleep | | |
| 13142 | sleep | | |
| 13151 | wake-up | | |
| 13152 | dawn | Lk | |
| 13153 | breakfast-time | Ll | |

Fig. 5

| | 30 32b 32a | 6 | 6 | 8 |
|---|---|---|---|---|
| | | ⊢→ | ⊢→ | |
| | TTL morning | 4 a.m. | sunrise + 1h | 0:30 |
| | TTL day | sunrise + 1h | sunset - 1h | 0:30 |
| | TTL evening | sunset - 1h | sunset + 1h | 0:30 |
| | TTL night | sunset + 1h | 4 a.m. | 0:30 |

| | 32b 32a | 2b | 2a |
|---|---|---|---|
| | TTL morning | morning | day |
| | TTL day | afternoon | |
| | TTL evening | evening | evening |
| | TTL night | night | |

| structured day | | | simplified day | | |
|---|---|---|---|---|---|
| reduced sleep | standard | extended sleep | reduced sleep | standard | extended sleep |
| -20% | 0 | +20% | -20% | 0 | +20% |

Fig. 8 a)

| BOARDING | 54a |
|---|---|
| WALKOUT | 54b |
| TTL | 54c |

52c 52b 52a  50 b)

| 12711 | BOARDING_morning |
| 12712 | BOARDING_day |
| 12713 | BOARDING_evening |
| 12714 | BOARDING_night |
| 12715 | WALKOUT_day |
| 12716 | WALKOUT_night |
| 12721 | TTL_morning |
| 12722 | TTL_day |
| 12723 | TTL_evening |
| 12724 | TTL_night | c)

| twilight | 60a |
| relax | 60b |
| work | 60c |

58c 58b 58a  56 d)

| 12731 | MORNING_twilight |
| 12732 | MORNING_relax |
| 12733 | MORNING_work |
| 12734 | DAY_relax |
| 12735 | DAY_work |
| 12736 | EVENING_early |
| 12737 | EVENING_relax |
| 12738 | EVENING_work |
| 12741 | NIGHT_relax |
| 12742 | NIGHT_work |
| 12743 | NIGHT_sleep dark |
| 12744 | NIGHT_sleep dimmed | e)

| 12761 | MEAL_breakfast |
| 12762 | MEAL_breakfast early |
| 12763 | MEAL_lunch |
| 12764 | MEAL_dinning bright |
| 12765 | MEAL_dinning social |
| 12766 | MEAL_dinning relaxed |
| 12767 | MEAL_dinning active |

Fig. 9
a)
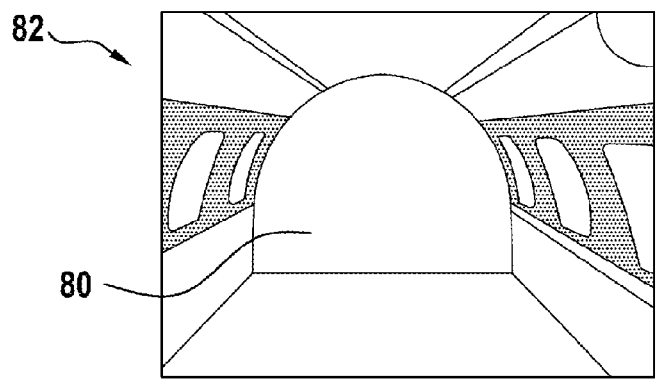
b)
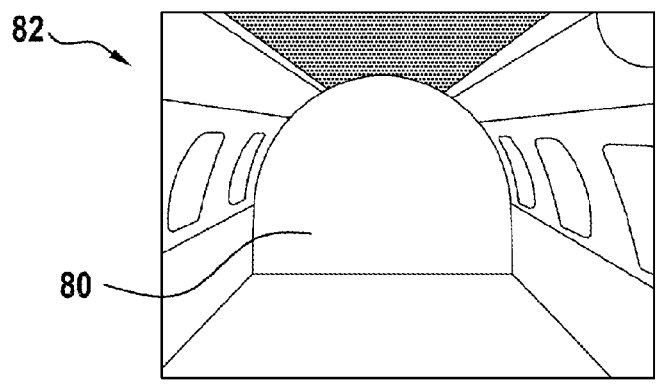
c)
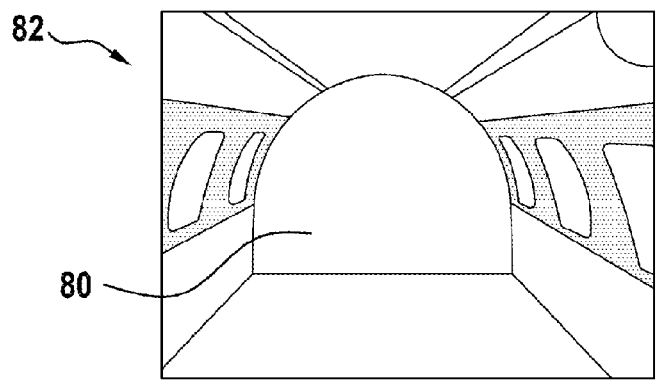

LIGHT PROGRAM FOR INTERIOR LIGHTING IN AN AIRCRAFT

BACKGROUND OF THE INVENTION

The present invention relates to a method for producing a light program for interior lighting in an aircraft during a flight.

DISCUSSION OF THE PRIOR ART

Flights in aircraft, especially long-haul flights, which are accompanied by a shift in the time of day for the passenger between start and landing often lead to passengers experiencing so-called "jetlag".

EP 1 561 640 A2 has disclosed a coloured light for the passengers of an aircraft. Here, a specific type of light may suppress the sleep of a human, facilitating a reduction in the effects of the jetlag.

WO 90/00777 A1 has disclosed a computer system for minimizing bodily malfunctions which arise from flight travel or shift work.

EP 2 724 746 P1 has disclosed a system and method for planning light therapy. The system for preventing jetlag symptoms of a user who travels over time zones, the user having a time of daily temperature minimum Tmin, comprises one or more radiation units adapted to direct bright light onto one or more neuroanatomical brain structures of an individual from at least one extracranial, non-ocular position, and planning means for calculating a westward dosing scheme for travels to the west and an eastward dosing scheme for travels to the east, wherein the dosing scheme is configured to be administered to the user on the arrival day, wherein the westward dosing scheme comprises: one or more doses of bright light, to be administered up to 6 hours before Tmin and configured to increase the alertness of the user, and one or more doses of bright light to be administered within 4 hours before Tmin and configured to delay the Tmin of the user, and wherein the eastward dosing scheme comprises: if less than 6 time zones are traversed: a dose of bright light between 1 and 4 hours after Tmin, wherein the dose is configured to advance the Tmin of the user, and a plurality of doses of bright light more than 6 hours after Tmin, wherein each of the doses is adapted to increase the alertness of the user, and if at least 6 time zones are traversed: a plurality of doses of bright light, to be administered between 1 and 4 hours before Tmin, wherein each dose is configured to delay the Tmin of the user.

DE 38 55 909 T2 has disclosed an apparatus and method for determining and modifying the circadian phase and amplitude. The method for physiological adaptation of a human subject to an activity/rest phase schedule if the subject is required to be active during some of the usual sleep hours, by modifying the current endogenous circadian cycle of the subject to a desired state, comprises the following steps: determining or estimating the physiological characteristic of a current endogenous circadian cycle of a subject; determining the characteristic of a desired endogenous circadian cycle for the subject; selecting at least one suitable time section on the basis of a mathematical or empirical model, with reference being made to the physiological characteristic of the current circadian cycle for the subject, during which time section a light stimulus comprising one or more bright light pulses and, optionally, dark pulses should be supplied to obtain a desired modification of the current endogenous circadian cycle of the subject; and supplying the light stimulus of bright light, and optionally darkness as well, during the selected suitable time section or the selected suitable time sections in order subsequently to obtain the desired endogenous circadian cycle for the subject.

US 2010/0174345 A1 has disclosed methods and systems for emitting light, which are able to supply a desired light-induced physiological stimulus and a desired light stimulus. The light may be controlled in order to vary the physiological stimulus within a predetermined first range, while the light stimulus is maintained within a predetermined second range which is useful for a number of self and/or spatial illumination applications. By way of example, an apparatus may comprise a controller for controlling the operating currents which are supplied to a multiplicity of light-emitting elements with different spectral characteristics, wherein the combination of currents is controlled in such a way that the mixed light, which is emitted, is associated with the desired physiological and light stimuli.

SUMMARY OF THE INVENTION

The present invention is directed to improving the reduction in the effects of the jetlag.

The method in accordance with the present invention serves to produce a light program. The light program serves to control lighting in an interior of an aircraft during a flight. A sequence list is set in accordance with the method. The sequence list contains a sequence of phases of the day. The entire sequence list covers an entire day, i.e. a time duration of 24 hours. A time of day, a phase duration and lighting data for the interior lighting are assigned to each phase of the day. Within the scope of the present invention, specifications in respect of times and duration may be absolute, i.e. expressed in e.g. hours and minutes. The specifications may also be relative, for example relate to the instant of another event, for example 3 hours after a specific event or 15 minutes longer than the duration of a specific event. The specifications may also be in percent, for example a percentage of the duration of a specific event.

In the method, the phase of the day corresponding to the respective time of day at the starting location is selected from the sequence list on the basis of the local time of the planned start of the flight and set as first program section of a flight program. The proportional associated phase duration of the selected phase of the day is assigned to the first program section as section duration. Here, "proportional" means that the time in accordance with the sequence list still remaining from the current instant to the end of the phase of the day is selected as phase duration.

The corresponding phase of the day is selected in the same way from the sequence list as last program section of the flight program on the basis of the estimated local time when the flight lands. Once again, the proportional phase duration is assigned to the last program section as section duration. The proportional associated phase duration is the duration from the start of the corresponding phase of the day to the respective local time which remains in the selected phase of the day in accordance with the sequence list.

Subsequently, the flight program between first program section and last program section is filled with phases of the day, lying therebetween as per the sequence list, as program sections. If the first program section and last program section should already be the two successive sections in the sequence list, no interposed program section is added. The associated complete phase durations are assigned to the corresponding program sections from the phases of the day or the sequence list as section durations.

Subsequently, at least one of the section durations in the flight program is scaled on the basis of a scaling prescription in such a way that the overall duration of the flight program corresponds to the flight duration. "Scaling" means lengthening or shortening. This method step is always necessary when the time difference between the local time upon landing and the local time at the start is accompanied by a time shift, i.e. deviates from the actual flight duration. The sum of all section durations in the flight program corresponds to the actual flight duration after the scaling.

In accordance with the method, the flight program then runs in time during the flight on the basis of the elapsed flight time. The run is based on the scaled section durations. The flight time is the absolute elapsed time after the actual instant of the start of the flight, without time shifts. In order to ignore time shifts, the flight time is counted e.g. on the basis of the running UTC (universal time coordinated) time, which is not subject to any time shifts on account of changes in location. Then, the lighting data of the respectively current program section are output as light program at each instant of the flight time or of the flight.

The flight data of the flight, i.e. the respective planned or estimated time of start and landing at the respective start location and landing location is known, and so a corresponding expected flight duration can also be established. The local time is the current local time at the start location or landing location.

In accordance with the invention, the method or a lighting system supplies a sequence of light scenarios (produced on the basis of the lighting data) on the basis of flight parameters, i.e. departure time and location, arrival time and location, and assigns an appropriate time duration to each scenario. The goal is that the light scenario reflects the current daylight phase (morning, day, evening, night) as per the sequence list by way of brightness and hue during the departure and at landing and during the course of the flight. The sequence of light scenarios is guided by a typical routine, as stored in the sequence list. An advantage arising in accordance with the invention is that of an automated light control, which is guided by a routine.

A special list with special phases is created in a preferred embodiment. A phase duration is assigned to each of the special phases. At least one additional program section with a section duration in the form of the corresponding phase duration is added to the flight program. Alternatively, or additionally, at least one part of an existing program section or a plurality of existing program sections is replaced by the additional program section—if a flight program with at least one program section already exists. The additional program section is taken from the list of special phases with corresponding phase durations. As a rule, at least one portion of the flight program is rescaled in respect of the section duration thereof after the addition or replacement so that the length of the flight program once again corresponds to the estimated flight duration. A corresponding program section of a special phase is e.g. "boarding", "taxi/take off/landing", "walkout" or the like. In accordance with this method variant, further specific program sections may be included in the flight program in order to introduce specific lighting situations into the planned routine of the lighting controller.

In a preferred embodiment, the scaling prescription contains minimum and/or maximum durations of program sections, which are observed during scaling. Thus, the section duration of a specific program section is e.g. not lowered below the minimum duration or raised above the maximum duration during the scaling. By way of example, only specific maximum durations should be provided for meal-times or specific minimum durations should not be undershot for sleep times. Then, other program sections are scaled more strongly instead in order to scale the program duration (sum of all section durations of the flight program) such that it corresponds to the estimated flight duration.

In a further embodiment, the scaling prescription contains a sleep time parameter which decisively influences the section duration of a program section provided for sleeping. "Decisively" means that the corresponding program section is scaled preferentially with respect to its section duration and all further program sections are appropriately scaled in a manner dependent on the scaling that was carried out. Thus, as desired, standard sleep times, shortened sleep times or lengthened sleep times may, for example, be taken into account in the light program, as desired by the passenger.

In a preferred embodiment, the lighting data (present in the flight program or output by the latter), during a transition between two program sections, are modified in accordance with a transition prescription and output as light program. Thus, there is e.g. a gradual transition of the lighting situation from a first program section to a second program section, without a jump-like switch in the corresponding lighting situation. By way of example, this is achieved by gradual dimming of the brightness and/or continuous colour curves for a colour change. This leads to a more pleasant overall impression for the passengers during the change of lighting scenarios. Expressed differently, the light program and/or the lighting data is/are modified again, after it was, or they were, output by the flight program.

In accordance with a further embodiment, the lights of the aircraft to which the light program is applied are selected and/or deselected. In this embodiment, the light program runs at all times and continuously in the background. Desired lights may be included in the program, i.e. operated in accordance with the lighting data, or decoupled therefrom, i.e. operated using different lighting data. Upon inclusion in the light program, the lights act in accordance with the light program; if the lights are deselected from the light program, the lights may be controlled manually or as desired, for example. In other words, specific lights or cabin regions with the corresponding lights may be included in the light program such that these are operated in accordance with the light program. Or they can be released from the light program in order to be controlled e.g. manually as desired. Selection and deselection is possible at all times. Transitions from, and back to, the light program can be designed in a passenger-friendly and gradual manner by way of appropriate transition times, superpositions, et cetera. As a result, a jump-like switchover of the lighting is avoided.

In a preferred embodiment, the flight program is reworked manually in respect of program sections and/or section durations. An automatically assembled flight program, which was scaled in respect of the section durations in accordance with the scaling prescription, may be adapted thus in order, for example, to take individual customer desires into consideration. Here, it is also possible to change only parts of the flight program and e.g. rescale the remaining sections of the flight program again in accordance with the scaling prescription in order ultimately to match the program duration to the flight duration again.

In a preferred embodiment, the lighting data are selected differently for the phases of the day in respect of the shades of white (e.g. warmer/cooler) of the illumination and/or an intensity of the illumination (e.g. brighter or darker) and/or a different illumination of various reflection surfaces of the interior or in the aircraft (e.g. ceiling brighter than side walls, or vice versa). By way of the corresponding lighting data, it is thus possible to create lighting situations which reproduce, excite or favourably influence specific phases of the day as per the biorhythm of a human.

In accordance with a preferred embodiment, a list of activities is created in the method. A modification prescription for lighting data is assigned to each activity. Then, an activity is assigned to a program section. The lighting data of the program section are modified on the basis of the modification prescription and output in a modified manner as light program. By way of example, the modification consists of an adaptation, in percent, of a parameter of the lighting data (e.g. increasing brightness by 20%, reducing the blue component by 40%) or of the replacement by other fixed lighting data. As a result, respective program sections or part of program sections may, once again, be adapted individually to specific requirements of passengers. By way of example, there may nevertheless be an individually designed light situation for a fixed simulated time of day or phase of the day. An example of this is an "evening" phase of the day, which, on the one hand, is used for relaxation ("relax" activity) and, on the other hand, is used for work ("work" activity) and which is therefore accompanied by different lighting situations ("work" brighter than "relax").

In accordance with a preferred embodiment, a list of moods is created in the method. A modification prescription for lighting data is assigned to each mood. Then, a mood is assigned to a program section. The lighting data of a program section are modified on the basis of the modification prescription. Here, the same explanations apply as above in respect of "activities" in an analogous fashion. Hence, a specific desired mood of passengers may also be taken into account in the lighting. An example of this is the "meal" special phase modification for partaking in a meal, with the "social" mood to create a communicative atmosphere or the "relaxed" mood to create a relaxed atmosphere when partaking in the meal.

For the two aforementioned embodiments (activity/mood), the modification prescription may, as a variant, be changed depending on the respective phase of the day of the program section. Hence, the modification prescriptions are different for different phases of the day, i.e. the lighting data of the program sections are modified differently depending on the respective individual program section. Thus, an individual modification depending on the phase of the day of the lighting situation is possible.

Embodiments of the invention, also in a combination of the aforementioned embodiments, possibly also with embodiments not mentioned previously, are summarized as follows:

Controlling the cabin lighting in the aircraft on the basis of the light program is also referred to as "daylight simulation". In particular, the daylight simulation starts with the planned or actual departure and ends with the estimated or actual arrival. In particular, the times are counted in UTC time.

In accordance with the invention, an automated control of the light emerges according to, or dependent on, flight phases (e.g. special phases) and a routine (e.g. sequence list). A manual selection from a restricted number of light scenarios by way of the aircraft crew was known previously. In accordance with the invention, a long-haul flight, for example, is structured on the basis of light scenarios representing various phases of the day. There is an automatic control of the light system on the basis of various options. Although manual control by the flight crew is possible after the start, it is no longer necessary. The invention provides a concept of how a routine may be represented by different light scenarios. The invention contains a computational prescription as to how a virtual routine may be mapped to the time zones of start and landing and the resultant flight time. The invention contains an ascertainment or calculation prescription as to how the correct light scenario may be determined at start and landing by flight parameters on the basis of the current light phase of the day by calculating sunrise and sunset.

According to the invention, a concept emerges for a daylight simulation. The invention is based on the general concept of specifying a tailored interior lighting for an aircraft, depending on flight phases and aligned to a conventional routine. The invention is based on the fundamental consideration that the biological clock of a human is based on daylight conditions during a day. In a simplified manner, this means: waking up in the case of middling light brightnesses, activity during the day at bright light conditions, coming to rest with reducing brightness, and sleeping during dark night. Moreover, the shades of white also vary throughout the day: grey or cool white light during twilight and in the morning. Standard white light at midday, warm white light in the evening, and "lighting at home" with warm shades of white at night. The biological clock is confused by a flight which starts and lands in different time zones (jetlag). The idea underlying a daylight simulation is that of controlling the cabin lighting systems in the aircraft in such a way as to help the biological clock to adapt more easily to the time-zone differences. The light perception of a passenger in the cabin is mainly influenced by the brightness and colour of the overall lighting. Depending on the current "phase of the biological clock", the intensity and colour of the overall illumination in the upper regions of the space and in the lower regions of the space is controlled in order to simulate the desired daylight setting within the boundaries of the available brightness ranges and the indirect illumination of cabin surfaces.

The daylight simulation is based on a sequence of phases of the day. The duration of each phase is stretched or shortened, in accordance with a programmed set of rules (scaling prescription) in order to achieve a transition from the start time zone to landing time zone within the flight time or flight duration. Each phase of the day is linked to default lighting (lighting data), which e.g. are stored in a preset database (PDB). The daylight simulation provides the "time controller" in relation to when and for how long a default setting is applied to a selected cabin region or to selected lights. If necessary, special transition sequences are used to provide soft transitions between the different phases of the day or the associated lighting scenarios. The daylight simulation may be applied to cabin regions and the crew region. The daylight simulation may be calculated and controlled by a computer, for example an ILSC (interior lighting system controller), on the basis of a defined set of parameters which is supplied by a cabin management system (CMS). Here, the CMS may provide flight data for the ILSC in order to calculate and determine the correct default settings (first and last program section of the flight program), which reflect the external light conditions during start and landing. By way of example, a special phase "taxi/take off/landing night" with corresponding default lighting (lighting data) may be selected if the flight starts or ends at night.

The daylight simulation may be controlled by means of the CMS by way of, in particular, two main instructions or instruction groups: 1. "Calculate and start the daylight simulation": here, the flight program is calculated and started in accordance with the flight data and selected options, and stored in the ILSC. 2. "Control the daylight simulation": the started daylight simulation may be paused and restarted, and a status query may be requested.

The ILSC makes information available, including status, current and subsequent phases or program sections, and the durations thereof. The daylight simulation may be calculated and started as soon as the required flight data are available: planned start time: in UTC (universal time coordinated) and date, start coordinates, estimated time of landing (in UTC) and date, landing coordinates. Thus, it is possible to calculate the local times for start and landing. In particular, two different sequence lists for phases of the day are available in order to meet the passengers' desires: 1. "Structured day": this sequence contains a detailed schedule of a routine, including mealtimes and preparation times (e.g. "go to bed"). 2. "Simplified day": the sequence is reduced to the main day and night phases and the transitions thereof. The duration of the phases may be influenced by three sleep options: "standard", "reduced sleep", and "extended sleep".

As a result of a calculation instruction, the user may obtain information about the daylight simulation sequence (flight program), without modifying the current light setting.

BRIEF DESCRIPTION OF THE DRAWINGS

Further features, effects and advantages of the invention emerge from the following description of a preferred exemplary embodiment of the invention and from the attached figures. Here, in a schematic diagram:

FIG. 1 shows two sequence lists for a simplified ("simplified") and a structured ("structured") routine, FIG. 5 shows a special list with special phases, FIG. 6 shows how a special phase is ascertained on the basis of subsequent program sections, FIG. 7 shows a table with effects of a sleep parameter, FIG. 8 a) shows a list of activities and b) shows the assignment thereof to special phases, c) shows a list of moods and d) shows the assignment thereof to phases of the day, and e) shows combinations of activities and moods, and FIG. 9 shows an interior of an aircraft with different lighting for a) breakfast, b) lunch and c) dinner.

DETAILED DESCRIPTION OF THE INVENTION

Figure 2:
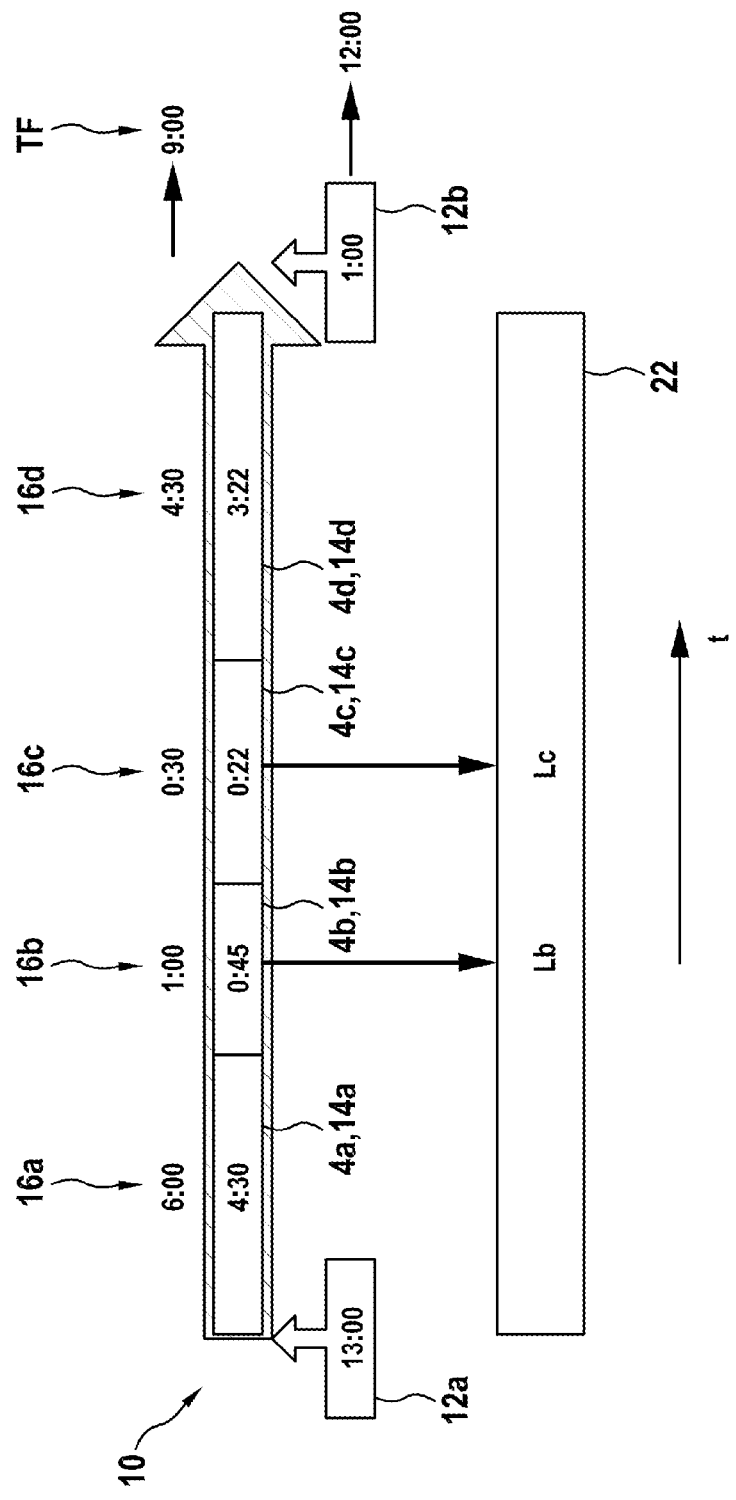
FIG. 2 shows a flight program before and after scaling, FIGS. 3 a) and b) show flight programs on the basis of different parameters and c) shows a flight program in the case of a restart during a flight, FIGS. 4 a) shows a flight program that is interrupted and b) shows the flight program being continued without a transition time and c) shows the flight program being continued with a transition time.

FIG. 1a shows a sequence list 2a "simplified day" of phases of the day 4a-e for a complete day, i.e. 24 hours. A time of day 6, and hence also a phase duration 8, is assigned to each phase of the day 4a-e. The phase durations 8 emerge from the respective differences of the times of day 6. Thus, the times of day 6 from 07:00 to 19:00, and hence a phase duration of 12 hours, are assigned to the "day" phase of the day 4a. Alternatively, FIG. 1a shows the assignment of phase durations 8 in the form of percentages of a complete 24-hour day, e.g. 50 percent for the "day" phase of the day 4a. In part, the phase durations 8 in FIG. 1 are specified for a plurality of phases of the day together. Moreover, lighting data La-e are assigned to each phase of the day 4a-e.

The depicted conditions or phase durations were determined by analysing a conventional routine in a 24-hour day.

FIG. 1b shows an alternative "structured day" sequence list 2 corresponding to FIG. 1a, but with a total of twelve instead of five phases of the day 4a-l. The times of day 6 were omitted for reasons of clarity.

FIGS. 1a and b show a first table column in one alternative. The lighting data La-l in this case are stored in the form of an identification number PDB_ID of a preset database (PDB) in the sequence list 2a, b. The actual lighting data are then found in the PDB.

FIG. 2 shows a flight program 10 for a flight, the start of which is planned at a local time 12a of 13:00 at a start location of the flight and the end of which is expected at a local time 12b of 1:00 at a landing location of the flight. Thus, the time difference in relation to the times of day is twelve hours. This is the time difference which must be processed by the passenger. However, the flight in fact only takes nine hours of pure flight time. In accordance with the local time 12a of 13:00, the "day" phase of day 4a, which contains this time of day, is gathered as first program section of the sequence list 2. The proportional associated phase duration of the phase of the day 4a from 13:00 to 19:00 is still six hours. This is assigned to the first program section 14a as section duration 16a. In accordance with the local time 12b for landing of 01:00 at night, the phase of the day 4d is selected as last program section 14d. The associated phase duration from 20:30 to 01:00 is 4.5 hours as phase duration 16d. The phases of the day 4b and 4c, lying between the phases of the day 4a and 4d, are likewise incorporated, lying therebetween, into the flight program 10, in each case with the associated full phase durations of one hour and thirty minutes. Now, the flight program 10 is completely filled with all appropriate phases of the day.

In accordance with a scaling prescription, in this case linear scaling, the twelve hours of the summed phase durations 16a-d are scaled down, in each case with the same ratio, in order to scale the sum of the phase durations 16a-d to the flight duration TF of nine hours. Therefore, all phase durations 16a-d are multiplied by a factor of 0.75.

In the example, the flight program 10 is stored in an ILSC of the aircraft (not depicted here) and started at the start of the flight as timing program, with the start point upon departure and end point upon landing. The respectively current program section 14a-d is selected in accordance with the progressing actual flight time t (e.g. counted on the basis of UTC), which runs from 0 to 9 hours. The corresponding lighting data La-d are output as light program 22 in accordance with the currently valid program section 14a-d, i.e. at each instant of the flight time (indicated in FIG. 2 by an arrow). Thus, a switchover is carried out from lighting data La to lighting data Lb after a flight time of four hours thirty minutes; a switchover is carried out to the lighting data Lc after a flight time of five hours fifteen minutes, and so on.

If the daylight simulation is started at a planned time which lies before the actual time of the start, this does not influence the light setting in the aircraft until the actual start time has been reached. If the actual flight time t or flight duration TF exceeds the estimated landing time, the daylight simulation does not influence the light conditions in the aircraft any further; by way of example, the last available light setting is kept until landing.

Figure 3:
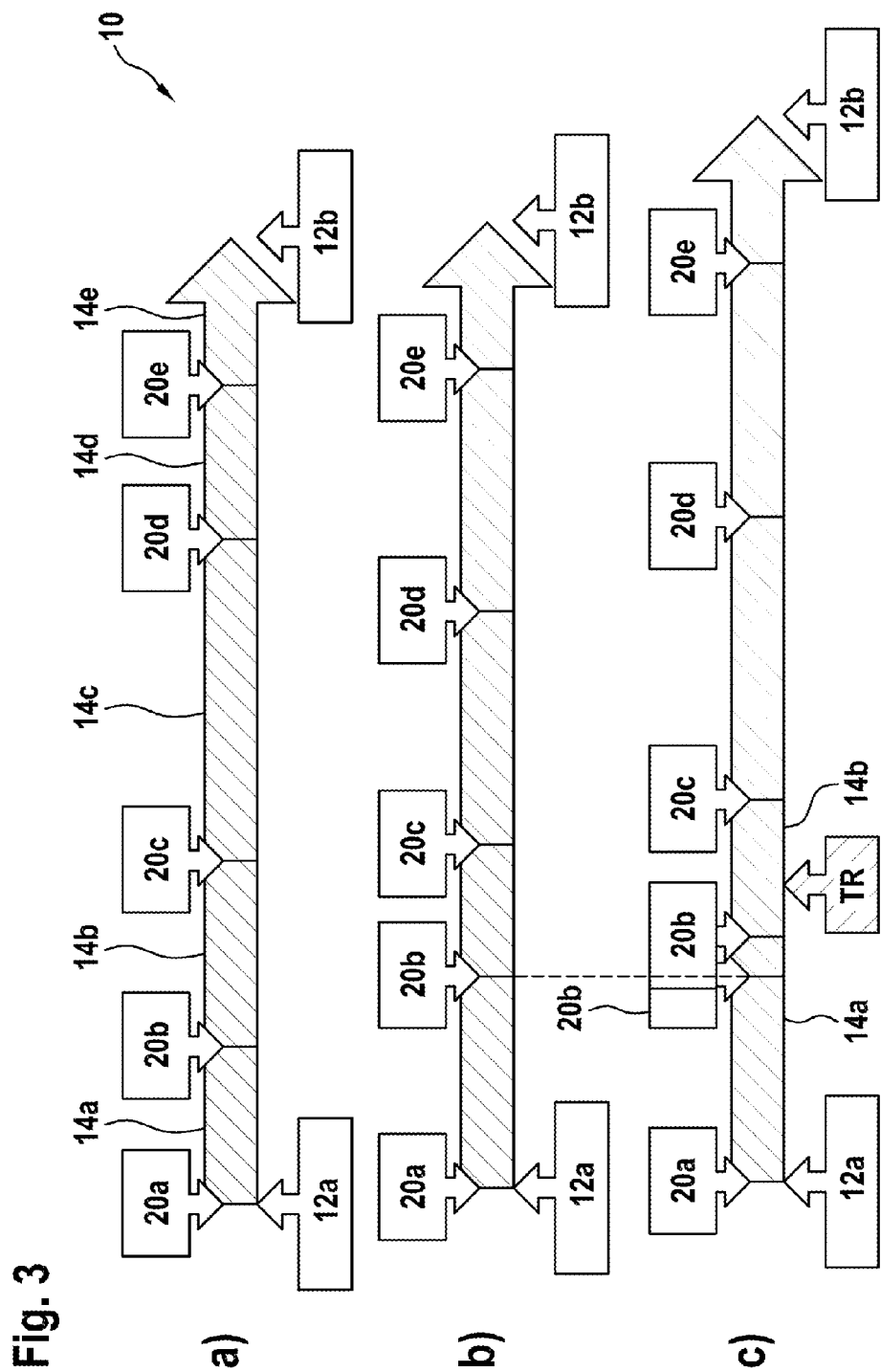

FIG. 3 shows an example for the flight data or options for the lighting changing during the flight. Thus, the daylight simulation with nine parameters may be restarted. In the flight program 10, additional program sections 14a, 14e "TTL" (taxi take off landing) in relation to FIG. 2 were incorporated into the flight program 10. The program sections 14b-d are "sunset", "sleep", "sunrise" in accordance with the sequence list 2a. FIG. 3a shows the originally planned flight program in accordance with the originally planned flight time. The program parts "TTL", "sunset", "sleep", "sunrise", and "TTL" are respectively started at the transitions 20a-e.

FIG. 3b shows the result of scaling with other parameters in the case of a moreover modified overall flight duration TF, which is why the individual program sections 14b-e start at different flight times, i.e. the transitions 20b-e are shifted. The program section 14a is started in an unmodified manner at the start time of the flight.

FIG. 3c shows how, proceeding from FIG. 3b, the daylight simulation is restarted at an instant TR. An in turn lengthened flight duration TF causes a corresponding shift of the program sections 14b-e or transitions 20a-e. Since some of the flight has already passed at the instant TR, the program section 14b is already running at this time, and so the change of the transition 20b, i.e. triggering the program section 14b, has no influence anymore on the lighting behaviour in the past.

Controlling the daylight simulation is effected by the "pause" and "restart" commands after the daylight simulation was successfully started. The principle of the daylight simulation control is that, after it was started, the phase of the day sequence "is available" at all times and the "pause" and "restart" commands control which lighting zones of the aircraft take part in the daylight simulation. Moreover, it is possible to query feedback about the current status of the daylight simulation. The current phase of the day in accordance with the calculated timeline, i.e. in accordance with the flight program 10, is determined by the current flight time. By way of a "fade in time" parameter, the user is able to specify a delay which defines a flight time or a program section 14a-l, when the daylight simulation is restarted. Furthermore, the user is able to specify a transition time. The latter specifies a time interval during which there is a fade from the current light setting to the light setting of the specific phase of the day.

While the daylight simulation is running, it automatically controls the light settings for selected lights or zones of the interior lighting in accordance with the calculated phase of the day sequence, with soft and slow transitions between the individual program sections or phases. If a different default setting is applied to a group of lights which are part of the daylight simulation, the other default setting is preferred. Lights that are not affected continue with the daylight simulation.

Figure 4:
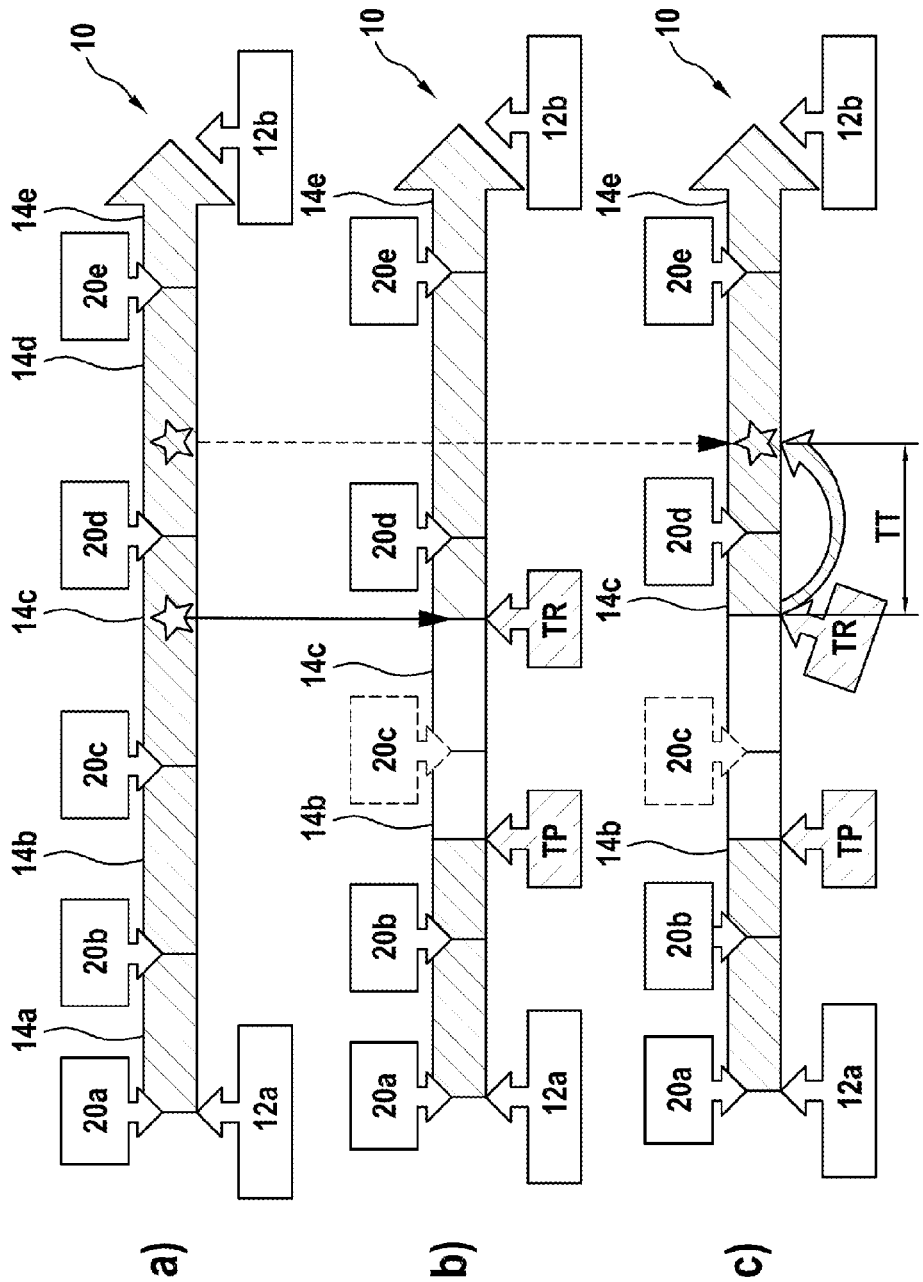

FIG. 4 shows an alternative flight program 10, which, in accordance with FIG. 4a, runs continuously and without interruptions from start to landing. In accordance with FIG. 4b, the light control is paused for a specific light group at an instant TP during the program section 14b. After this time, the lights are operated according to a different prescription, but not in accordance with the lighting data Lb of the program section 14b. The flight program continues in an unmodified manner without considering whether lights—and if so, which lights—are assigned thereto. The lights are reassigned to the flight program 10 at the instant TR, with a turn on time of zero being selected in this case. In the meantime, the program section 14c has become current. The lights are instantaneously switched over to the lighting data Lc of the program section 14c. FIG. 4c shows a restart of the lighting program at the same instant TR, but with a time interval TT of the transition time such that, during the depicted time interval TT, a soft and gradual continuous transition takes place for all lights, from their current value at the start of the time interval TT to the lighting in accordance with the lighting data Ld.

The ILSC of the aircraft (not illustrated) provides information for the daylight simulation as a response to the following events: "calculation" or "start" of the daylight simulation, "pause" or "restart" of the daylight simulation or "query of status feedback".

The response contains the status ("calculated", "started", "fault"), the selected options, an identification number of the current program section 14a-l and the remaining section duration 16a-d, the identification numbers of subsequent program sections 14a-l and the section durations 16a-d thereof. Using the remaining section durations 16a-d of the current program section 14a-l and the sequence of the provided program sections 14a-l and the section durations 16a-d thereof, a graphical user interface (GUI) is capable of depicting the calculated timing for the aircraft crew and the passengers. The flight program 10 of the daylight simulation only changes if the daylight situation is started with a new set of flight data parameters.

FIG. 5 shows a special list 30 of special phases 32a-d, to which appropriate times of day 6 are assigned. Here, the times of day 6 are specified as relative time specifications in relation to sunrise ("sunrise") and sunset ("sunset"). The special phases are phases for TTL in the morning, during the day, in the evening and at night ("morning, day, evening, night"). By way of example, the special phase 32a is selected if a TTL phase in the flight program 10 is selected at a local time of between 04:00 in the morning and one hour after sunrise. The respective phase durations 8 are thirty minutes in each case. A daylight simulation using these special phases 32a-d is carried out according to the following steps:

The associated special phase 32a-d is selected as per the assigned time of day 6 in accordance with the local time 12a, b during start and landing. This phase is incorporated into the flight program 10. Here, the "TTL" phase is determined by calculating the sunrise or sunset times in accordance with the estimated departure or landing times, locations and the appropriate date. If the calculation of a sunrise or sunset time proves impossible, for example due to the polar night, the sunrise time is set to 07:00 in the morning and the sunset time is set to 19:00 in the evening. Alternatively, or additionally, the fitting "TTL" phase 32a-d may also be selected according to which subsequent phase of the sequence list 2a, b is selected or desired after the end of the TTL phase. By way of example, the TTL morning TTL phase is selected if the phase of the day 4a of the sequence list 2b is selected or desired as subsequent phase in the flight program 10. A time interval of: landing time–starting time–2×TTL time remains for the residual remaining flight time, which is divided among the other phases of the day 4a-l or special phases 32a-d. Thus, here, the TTL time is never scaled and always set to 30 minutes. Here, there is a special calculation prescription that the TTL time is not scaled, i.e. a maximum duration and a minimum duration of in each case 30 minutes, which should be observed.

FIG. 6 shows a table for selecting TTL phases depending on which phase of the day 4a-l is selected or desired in the subsequent program section 14 in accordance with the sequence list 2a (second column; "structured day") or 2b (third column; "simplified day").

The sequence of the phases of the day is defined by an internal PDB list, in which a default setting or an internal transition sequence for the interior lighting is assigned to each phase of the day.

A selection option during the daylight simulation is, for example, the selection of a specific sequence list 2*a* or 2*b* as a basis for the daylight simulation.

FIG. 7 shows a further option, namely a sleep time parameter 40. The selection of a corresponding "standard", "reduced sleep" or "extended sleep" option has effects on the calculation prescriptions for the duration of the sleep phases and phases of the day. The respective sleep phases 4*d* and 4*i*, respectively, of the sequence lists 2*a, b* are accordingly shortened or lengthened by twenty percent, or left unchanged. The basis for this is the original length of the assigned phase durations 8, scaled to the flight duration TF. Only once the section durations 16 for the relevant sleep phase were finally set in accordance with the sleep time parameter are the remaining residual program sections 14 matched to the set sleep phase. By way of example, if the scaled sleep phase yields a duration of five hours, a reduced sleep phase of four hours or a lengthened sleep phase of six hours emerges.

In the example, the calculation prescription for phase durations 16 is alternatively based on the use of the percentage phase relationships in accordance with the phase durations 8 from FIGS. 1*a, b*. Thus, in order to calculate each individual phase duration 16, each phase is scaled in accordance with the specified percentage values, i.e., for example, according to appropriate percentage values of "day", "evening" and the summed portion for "sunset", "sleep" and "sunrise" for the sequence list 2*a*. For the purposes of assigning the specific phase or section durations 16 to each program section or phase, the following is taken into account: phases with a fixed duration, which are not scalable (e.g. "noon", "sunset", "breakfast-time"), phases with a variable duration (for example "morning", "sleep", etc.), minimum and maximum permitted durations (minimum duration/maximum duration) of phases (by way of example, sleep phases with a duration of less than one hour are pointless).

The following should still be mentioned in respect of the calculation principles of the flight program 10 or the scaling of the section durations 16*a-d*:
the daylight simulation is calculated on the basis of parameters which are supplied by the CMS using well-defined rules. The resultant sequence of phases of the day or program sections 14 may be simulated by a "calculated" command in order to provide the user with the option of evaluating the offered control by the daylight simulation in the form of the ascertained and scaled flight program 10 and deciding whether this meets the passenger demands. There are limits to the usefulness of the daylight simulation depending on the flight plan, i.e. the relationship between start location and landing location and time zones and, specifically, the duration of the flight. There is a set of parameters for which the daylight simulation brings virtually no changes. An example would be a flight from Munich to Montréal, in which the sequence list 2*a* for "simplified day" was selected, with a start at 10:00 in the morning (UTC=09: 00 in the morning), arrival at 11:00 morning (UTC=04:00 in the afternoon). The ascertained sequence in the flight program 10 is the following: program section 14*a* "TTL", section duration 16*a* thirty minutes; program section 14*b* "day", section duration 16*b* six hours; program section 14*c* "TTL", section duration 16*c* 30 minutes. Depending on the specified parameters and the described calculation rules, phases of the day 4 may be skipped in the sequence of phases of the day 4 (sequence list 2). Between the program sections 14, there is a soft transition between the corresponding light settings or lighting data L. The described calculation rules are part of the ILSC software. The durations of phases of the day 4 and of special phases 30 with a fixed phase duration 8 (these are not scaled but incorporated with the absolute durations into the flight program) are stored internally in the PDB. The highlighted phases of the day in FIGS. 1*a, b* ("sunset", "sunrise", "falling asleep", "wake-up") are special internal light scenes which are available even to a temporally dynamic transition between light settings of preceding and subsequent phases of the day (transition of the lighting data L from "evening" to "sleep", "sleep" to "day", etc.).

FIG. 8*a* shows a list 50 of activities 52*a-c*, in this case "boarding", "walkout" and "TTL" in an exemplary manner. A modification prescription 54*a-c* is assigned to each activity 52*a-c*. Now, a corresponding activity may be assigned to a program section 14 in the flight program 10. Then, lighting data L assigned to the program section 14 are modified by the modification prescription 54 of the assigned activity 52. That is to say, the lighting is matched to the corresponding activity 52*a-c*. However, since the modification is based on the respective basic lighting data L, the basic properties of the lighting which fit to the program section are maintained. Hence, the lighting once again is guided by the various default settings of the lighting, depending on the phase of the day. Default settings for light scenarios which may be used for the daylight simulation emerge in the preset database (PDB) from appropriate combinations of the phases of the day with activities. In particular, the assignment of default settings to specific phases of the day, i.e. phases of the day with assigned activities, is internal in the preset database PDB.

FIG. 8*b* shows a corresponding section from a preset database with corresponding characteristics (PDB_ID) for combinations of phases of the day and activities in the first table column.

FIG. 8*c* shows a list 56 of moods 58*a-c*, which once again have modification prescriptions 60*a-c* assigned thereto. In this case, moods 58 may also be assigned to individual program sections 14 or phases of the day 4. Analogously, the same statements as above in respect of the list 50 apply. The corresponding lighting data L are also modified in accordance with the modification prescriptions 60.

FIG. 8*d* shows corresponding examples as a section from a preset database.

FIG. 8*e* shows further possible combinations, in which activities (e.g. "meal_breakfast", "meal_lunch", etc.) are combined with moods ("early", "bright", "social", etc.). Here too, there is always an assignment of a characteristic from the preset database (PDB_ID).

FIG. 9*a-c* shows various lighting variants for the lighting of an interior 80 in an aircraft 82, which is only depicted in sections, during the flight thereof. FIG. 9*a* shows lighting with lighting data for the "morning" phase of the day with the "breakfast" activity. Here, cool hues are selected with a middling light intensity. The lighting focus is on the side wall lighting in order to impart a "wider" cabin as subjectively perceived impression. FIG. 9*b* shows the "day" phase of the day with the "lunch" activity. Here, middling hues are selected with a high light intensity. The emphasis lies on the ceiling lighting in order to cause a "higher" cabin as subjective observer impression ("sky in the middle of the day"). FIG. 9*c* shows "evening" or "night" phase of the day during the "dinner" activity. Here, warm hues are selected with middling to low light intensity. The emphasis of the lighting once again is on the side wall in order to impart a "wider" cabin and a "feeling of home" as subjectively perceived impression.

The application of the middling to low light intensity depends on the desired subjective effect for the observer. By way of example, so-called "lounge" default settings are used to produce a relaxed mood. The application of colours in the ceiling lighting serves for accentuation purposes. White colours or colour temperatures at the side walls are used for the main cabin lighting. Optionally, default settings may be provided in order to provide adequate lighting for observing moving images (movies, videos, television broadcasts, etc.). In the example, there are three moods with low (dark) and middling brightnesses. By way of example, if a monitor is fastened to a side wall of the interior, there is a sidewall illumination for reducing the contrast between screen and surroundings. For a monitor assembled at an end-face cabin separation wall, the lighting is selected to reduce glare and reflections and, furthermore, obtain lighting with generally little brightness. By way of example, default settings may be provided for specific film/television themes, for example "standard lighting", "sport lighting", and so on. The default settings may be "mirrored" in order to provide default settings for the monitor assembly at opposing side walls. It is also possible to set a selected film setting on one cabin side and mirror this to the other side in order to produce further light scenarios by the CMS controller.

LIST OF REFERENCE SIGNS 2a, b Sequence list
4a-l Phase of the day
6 Time of day
8 Phase duration
10 Flight program
12a, b Local time
14a-e Program section
16a-e Section duration
20a-e Transition
22 Light program
30 Special list
32a-d Special phase
40 Sleep time parameter
50 List of activities
52a-c Activity
54a-c Modification prescription
56 List of moods
58a-c Mood
60a-c Modification prescription
80 Interior
82 Aircraft
La-e Lighting data
TR Instant
TP Instant
TT Time interval
TF Flight duration
t Flight time
PDB_ID Characteristic

What is claimed is:

1. A method for producing a light program for controlling lighting in an interior of an aircraft during a flight wherein:
a sequence list of phases of the day for a full day is set, wherein a time of day, a phase duration and lighting data for the lighting are assigned to each phase of the day,
the appropriate phase of the day is selected from the sequence list as first program section of a flight program on the basis of the local time at which the flight starts and the proportional associated phase duration is assigned to the first program section as section duration,
the appropriate phase of the day is selected from the sequence list as last program section of the flight program on the basis of the local time at which the flight lands and the proportional associated phase duration is assigned to the last program section as section duration,
the flight program between first program section and last program section is filled with the phases of the day, lying there between as per the sequence list, as program sections and the associated phase durations are assigned to the program sections as section durations,
at least one of the section durations is scaled on the basis of a scaling prescription in such a way that the overall duration of the flight program corresponds to the flight duration, and
the flight program runs in time during the flight on the basis of the elapsed flight time, wherein the lighting data of the respective current program section are output as light program at each instant of the flight time.

2. The method according to claim 1, wherein
a special list of special phases with assigned phase duration is created,
at least one additional program section with a section duration is added to the flight program on the basis of the corresponding phase duration, and/or
at least part of at least one existing program section is replaced by the additional program section in the flight program, and wherein
the additional program section is taken from the special list and the corresponding phase duration of the special phase is assigned to the additional program section.

3. The method according to claim 1, wherein the scaling prescription contains minimum and/or maximum durations of program sections, which are observed during the scaling.

4. The method according to claim 1, wherein the scaling prescription contains a sleep time parameter which decisively influences the section duration of a program section provided for sleeping.

5. The method according to claim 1, wherein during a transition between two program sections, the lighting data are modified in accordance with a transition prescription and output as light program.

6. The method according to claim 1, wherein the section durations are rescaled during the flight if the flight duration changes.

7. The method according to claim 1, wherein the lights of the aircraft to which the light program is applied are selected and/or deselected.

8. The method according to claim 1, wherein the lighting data are selected differently in respect of the shades of white of the illumination and/or an intensity of the illumination and/or a different illumination of various reflection surfaces of the interior.

9. The method according to claim 1, wherein a list of activities is created, wherein a modification prescription for lighting data is assigned to each activity; an activity is assigned to a program section; and the lighting data of the program section are modified on the basis of the modification prescription and output as light program.

10. The method according to claim 9, wherein the modification prescription is changed depending on the respective phase of the day of the program section.

11. The method according to claim 1, wherein a list of moods is created, wherein a modification prescription for lighting data is assigned to each mood; a mood is assigned to a program section; and the lighting data of the program section are modified on the basis of the modification prescription and output as light program.

12. The method according to claim 11, wherein the modification prescription is changed depending on the respective phase of the day of the program section.

* * * * *